United States Patent
Nienhoff et al.

(10) Patent No.: US 11,136,911 B2
(45) Date of Patent: Oct. 5, 2021

(54) METHOD AND DEVICE FOR DIAGNOSIS OF A PARTICLE FILTER ARRANGED IN THE EXHUAST GAS SYSTEM OF A PETRO-OPERATED INTERNAL COMBUSTION ENGINE

(71) Applicant: Vitesco Technologies GMBH, Hannover (DE)

(72) Inventors: Michael Nienhoff, Regensburg (DE); Hao Chen, Regensberg (DE); Paul Rodatz, Landshut (DE)

(73) Assignee: Vitesco Technologies GmbH, Hannover (DE)

(*) Notice: Subject to any disclaimer, the term of this patent is extended or adjusted under 35 U.S.C. 154(b) by 2 days.

(21) Appl. No.: 16/716,854

(22) Filed: Dec. 17, 2019

(65) Prior Publication Data

US 2020/0200063 A1 Jun. 25, 2020

(30) Foreign Application Priority Data

Dec. 19, 2018 (DE) ...................... 10 2018 222 247.9

(51) Int. Cl.
*F01N 9/00* (2006.01)
*F01N 11/00* (2006.01)
(Continued)

(52) U.S. Cl.
CPC ............ *F01N 11/002* (2013.01); *F01N 9/002* (2013.01); *F01N 11/005* (2013.01);
(Continued)

(58) Field of Classification Search
CPC .... F01N 11/002; F01N 2560/06; F01N 11/00; F01N 2900/0418; F01N 2900/1404; F01N 2900/1631; F02D 41/1446; F02D 41/029
See application file for complete search history.

(56) References Cited

U.S. PATENT DOCUMENTS

2005/0143897 A1 6/2005 Ripper et al.
2008/0041035 A1* 2/2008 Sawada ................. F01N 11/005
60/277
(Continued)

FOREIGN PATENT DOCUMENTS

DE 19907382 A1 8/2000
DE 10358195 A1 7/2005
(Continued)

OTHER PUBLICATIONS

German Office Action dated Jul. 15, 2019 for corresponding German Patent Application No. 10 2018 222 247.9.

Primary Examiner — Matthew T Largi (57) ABSTRACT

Determining the presence of a particle filter in the exhaust gas tract of an engine, with the steps of determining a first exhaust gas temperature curve which occurs in the exhaust gas tract upstream of the particle filter; measuring a second exhaust gas temperature curve by a first temperature sensor arranged downstream of the particle filter; determining a first heat quantity by integration over a specific time of a first heat flow curve determined by a first exhaust gas mass flow, a first specific heat capacity and the first exhaust gas temperature curve; determining a second heat quantity by integration over the specific time of a second heat flow curve determined by a second exhaust gas mass flow, a second specific heat capacity and the second exhaust gas temperature curve, evaluating the first heat quantity and the second heat quantity to determine the presence of the correct particle filter.

18 Claims, 3 Drawing Sheets

(51) Int. Cl.
*F02D 41/14* (2006.01)
*F02D 41/02* (2006.01)

(52) U.S. Cl.
CPC ...... *F01N 2550/02* (2013.01); *F01N 2550/04* (2013.01); *F01N 2550/24* (2013.01); *F01N 2560/06* (2013.01); *F01N 2900/0418* (2013.01); *F01N 2900/1631* (2013.01); *F02D 41/029* (2013.01); *F02D 41/1446* (2013.01); *F02D 2200/0812* (2013.01)

(56) References Cited

U.S. PATENT DOCUMENTS

| | | | |
|---|---|---|---|
| 2010/0050608 A1* | 3/2010 | Jayachandran | F01N 11/005 60/286 |
| 2010/0050758 A1 | 3/2010 | Wang et al. | |
| 2012/0023911 A1* | 2/2012 | Liu | F01N 11/005 60/277 |
| 2015/0033837 A1 | 2/2015 | Niemeyer et al. | |
| 2016/0265413 A1* | 9/2016 | Willimowski | G01K 13/02 |
| 2019/0063284 A1* | 2/2019 | Santillo | F01N 3/021 |

FOREIGN PATENT DOCUMENTS

| | | | | |
|---|---|---|---|---|
| DE | 102005042843 A1 * | 11/2006 | | F01N 11/005 |
| DE | 102005042843 A1 | 11/2006 | | |
| DE | 102011002438 A1 | 7/2012 | | |
| DE | 102011115328 A1 | 4/2013 | | |
| DE | 102016225758 A1 | 6/2018 | | |

* cited by examiner

FIG 1

METHOD AND DEVICE FOR DIAGNOSIS OF A PARTICLE FILTER ARRANGED IN THE EXHUAST GAS SYSTEM OF A PETRO-OPERATED INTERNAL COMBUSTION ENGINE

CROSS-REFERENCE TO RELATED APPLICATIONS

This application claims priority to German Application No. DE 10 2018 222 247.9, filed Dec. 19, 2018. The disclosure of the above application is incorporated herein by reference.

FIELD OF THE INVENTION

The invention concerns a method and a device for diagnosis of a particle filter arranged in the exhaust gas system of an internal combustion engine.

BACKGROUND OF THE INVENTION

Increasingly stricter legal emission limit values impose ever higher requirements on the exhaust gas systems of motor vehicles. In order to be able to meet such requirements, different exhaust gas emission reduction strategies must be applied simultaneously. These different exhaust gas emission reduction strategies use different components, each including associated sensors.

As well as the reduction in fuel consumption and hence CO2 emissions, an essential development objective is to reduce the gaseous emissions of CO, NOx and HC by means of one or more exhaust gas catalytic converters, and to reduce particle emissions by means of particle filters.

Particle filters for diesel internal combustion engines, often also described as soot filters, have been in use for some time and proven successful in practice.

Furthermore, it is already known that particles also occur in the exhaust gas tract of a petrol-operated internal combustion engine, in particular with direct fuel injection in which the fuel is introduced directly into the combustion chambers under high pressure and very finely atomized. Therefore, legislators have also reduced the limit values for particle emissions from petrol-operated internal combustion engines with direct fuel injection. Thus, with the introduction of the Euro 6c emissions standard, the applicable limit value of maximum $6\times10^{12}$ particles/km must be observed.

The particle filters used for this substantially consist of a housing (or can) and a monolith inserted in the housing. This largely filters the particles, mainly soot particles occurring during combustion, out of the exhaust gas. The separated particles remain in the particle filter as long as the conditions prevailing in the particle filter—for example high temperature, oxygen in the exhaust gas—do not lead to regeneration of the particle filter.

It may occur that the particle filter either has not been installed, or has been removed later, or the housing of the particle filter has been installed but the monolith(s) removed, in order to at least give the optical impression that an operable particle filter is present.

Since the particle filter is an emission-relevant component in the same way as the exhaust gas catalytic converter and exhaust gas sensors, legislators require the reliable detection of an uninstalled or absent filter monolith of the particle filter in the context of on-board diagnosis.

Previous methods for checking the installation of a particle filter have been based on evaluation of the temporal development of temperatures upstream and downstream of the particle filter. Also, installation checks are possible which are based on analysis of the temporal gradients of the differential pressure. Since the differential pressures across a particle filter are typically very small, in contrast to differential pressures over a diesel particle filter, this method is usually relatively inaccurate.

DE 10 2016 225 758 A1 discloses a method and a device for monitoring a particle filter arranged in the exhaust gas system of an internal combustion engine, which also allow checking of whether a monolith is present in the housing of the particle filter or has been removed. Here, the pressure measurement signals provided by a secondary air pressure sensor of the internal combustion engine are evaluated. In the context of monitoring the particle filter, a pressure signal curve determined from the output signals of the secondary air pressure sensor is compared with a pressure signal curve from a secondary air pressure model, and if the pressure values of the pressure signal curve determined using the pressure measurement signals provided by the secondary air pressure sensor are lower than the pressure values of the pressure signal curve from the secondary air pressure model, it is detected that there is no monolith in the housing of the particle filter. If the pressure values of the pressure signal curve determined using the pressure measurement signals provided by the secondary air pressure sensor correspond to the pressure values of the pressure signal curve of the secondary air pressure model, it is detected that a monolith not loaded with particles is present in the housing of the particle filter.

DE 10 2011 002 438 A1 describes a method and a device for determining the load of a particle filter in the exhaust gas duct of an internal combustion engine, wherein by means of a pressure increase device, a gas stream may be introduced into the exhaust gas tract upstream of the particle filter, wherein a first pressure sensor upstream of the particle filter determines the gas pressure, wherein to determine the load on the particle filter, by means of the pressure increase device, a gas stream is introduced into the exhaust gas duct upstream of the particle filter, wherein the load is determined from the difference in gas pressures upstream and downstream of the particle filter. The pressure increase device here is a secondary air pump. Also, incorrect installation or absence of the particle filter is detected since the difference in gas pressures upstream and downstream of the particle filter allows a conclusion about its correct installation.

SUMMARY OF THE INVENTION

The object of the present invention is to specify a method and a device with which the presence or absence of a particle filter, correctly arranged in the exhaust gas system of a petrol-operated internal combustion engine, is reliably checked.

The object is achieved by the features described herein. Advantageous embodiments and refinements are also described.

According to the present disclosure, a method for determining a presence of a particle filter in the exhaust gas tract of a petrol-operated internal combustion engine having the following steps:

determining a first exhaust gas temperature curve which occurs in the exhaust gas tract upstream of an installation position of the particle filter;

measuring a second exhaust gas temperature curve by means of a first temperature sensor arranged downstream of the installation position of the particle filter;

determining a first heat quantity by integration over a specific time of a first heat flow curve which is determined by means of a first exhaust gas mass flow, a first specific heat capacity and the first exhaust gas temperature curve;

determining a second heat quantity by integration over the specific time of a second heat flow curve which is determined by means of a second exhaust gas mass flow, a second specific heat capacity and the second exhaust gas temperature curve;

evaluating the first heat quantity and the second heat quantity in order to determine the presence of the particle filter.

The installation position is the position in the exhaust gas tract in which the particle filter is to be arranged. A position upstream of the installation position of the particle filter is any position which lies upstream of the particle filter in the flow direction of the exhaust gas of the internal combustion engine. According to one embodiment, for example an exhaust gas catalytic converter is arranged upstream of the installation position of the particle filter. Accordingly, the exhaust gas first flows through the exhaust gas catalytic converter and then through the particle filter. A position downstream of the installation position of the particle filter lies downstream of the particle filter in the flow direction of the exhaust gas of the internal combustion engine.

The first exhaust gas temperature curve is the curve of a temperature of the exhaust gas upstream of the installation position of the particle filter. According to one embodiment, directly upstream of the particle filter, for example between the exhaust gas catalytic converter and the particle filter.

The second exhaust gas temperature curve is the curve of a temperature of the exhaust gas downstream of the installation position of the particle filter. According to one embodiment, directly downstream of the particle filter. The second exhaust gas temperature curve is determined by means of the first temperature sensor. For this, the first temperature sensor is arranged in the exhaust gas tract downstream of the installation position of the particle filter and detects the temperature of the exhaust gas flowing by. The temperature may be detected for example discretely, at predefined time intervals, or continuously, i.e. cohesively without gaps, over a specific time period. If the temperature is detected discretely, the curve of the individually detected temperatures are calculated for example using various mathematical approaches.

A mass flow is a mass of the medium moving through a cross-section per time interval. Accordingly, the first mass flow is the mass of the exhaust gas which moves through the exhaust gas tract upstream of the installation position of the particle filter per time interval. The specific heat capacity is the capacity of a substance to store thermal energy. Accordingly, the first specific heat capacity is the capacity of the exhaust gas upstream of the installation position of the particle filter to store thermal energy.

A heat flow is the product of the mass flow, the specific heat capacity and an exhaust gas temperature. According to a further embodiment, instead of the exhaust gas temperature, the difference between the exhaust gas temperature and a standard temperature is used. The standard temperature is a reference temperature and in one embodiment remains constant over time. According to a further embodiment, the standard temperature is 20° C. Consequently, the first heat flow is determined upstream of the installation position of the particle filter at a specific time if the first exhaust gas mass flow is multiplied by the first specific heat capacity and the difference between the first exhaust gas temperature, which is determined from the first exhaust gas temperature curve at the specific time, and the standard temperature. The first heat flow curve over the specific time interval may accordingly be determined from the first exhaust gas temperature curve obtained over the specific time.

The second heat flow downstream of the installation position of the particle filter at a specific time is determined, according to an embodiment, if the second exhaust gas mass flow is multiplied by the second specific heat capacity and the difference between the second exhaust gas temperature, which is determined from the second exhaust gas temperature curve at the specific time, and the standard temperature. The second heat flow curve over the specific time interval may accordingly be determined from the second exhaust gas temperature curve obtained over the specific time.

A heat quantity is the heat transmitted within a time period. If accordingly a heat flow curve within the specific time period is integrated, the heat quantity transmitted within the specific time is determined.

The first heat quantity, which was transmitted within the specific time through the exhaust gas tract upstream of the installation position of the particle filter, may consequently be determined by integrating the first heat flow curve over the specific time.

The second heat quantity, which was transmitted within the specific time through the exhaust gas tract downstream of the installation position of the particle filter, may consequently be determined by integrating the second heat flow curve over the specific time.

In order for the first heat quantity and second heat quantity to be able to compared easily, the time over which the first heat flow curve is integrated and the time over which the second heat flow curve is integrated are substantially identical. According to an embodiment, the time over which the first heat flow curve and the second heat flow curve are integrated is identical.

The particle filter includes a housing and at least one monolith. The exhaust gas, which has a specific temperature, flows through the particle filter, in particular through the monolith, and in so doing emits a specific quantity of heat. By determining the first heat quantity transmitted within a specified time through the exhaust gas tract upstream of the installation of the particle filter, and the second heat quantity transmitted within the specified time through the exhaust gas tract downstream of the installation position of the particle filter, it is determined how much heat quantity the particle filter, in particular the monolith, has absorbed.

The particle filter accordingly acts as a heat sink. In particular during a warm-up phase, the heat quantity absorbed by the particle filter is relatively large.

If no correct particle filter is installed in the installation position of the particle filter, or if the monolith has been removed from the particle filter, a difference between the first heat quantity and the second heat quantity is small in comparison with a correctly installed particle filter.

Accordingly, it is reliably and robustly determined from the first heat quantity and the second heat quantity whether the correct particle filter is present in the exhaust gas tract. The first heat quantity and the second heat quantity are determined over a specific period. Accordingly, a longer period is evaluated in order to check whether or not a particle filter is installed. In particular therefore, it is reliably and robustly determined whether the particle filter is correctly installed.

A correct particle filter may be a particle filter which filters the required number of particles from the exhaust gas of the exhaust gas tract, and consequently functions correctly. An incorrect particle filter installation may for example include the monolith having been removed completely or partially from the housing of the particle filter, or the entire particle filter having been removed from the exhaust gas tract. An incorrect particle filter may for example also be a non-functioning one, i.e. the particle filter does not filter any particles or does not filter the required number of particles from the exhaust gas.

According to an embodiment, the first exhaust gas temperature curve is determined by means of a second temperature sensor which is arranged upstream of the installation position of the particle filter. For this, the second temperature sensor is arranged in the exhaust gas tract upstream of the installation position of the particle filter and detects the temperature of the exhaust gas flowing by. The temperature may be detected for example discretely, at predefined time intervals, or continuously, i.e. cohesively without gaps, over a specific time period. If the temperature is detected discretely, the curve of the individually detected temperatures is determined for example using various mathematical approaches. If both the first exhaust gas temperature curve and the second exhaust gas temperature curve are determined by means of sensors, any faults may easily be detected. Also, the first exhaust gas temperature curve is detected particularly precisely. This makes determining the presence of the particle filter particularly reliable and robust.

According to an embodiment, the first exhaust gas temperature curve is determined using a predefined temperature model. It is conceivable that the first exhaust gas temperature curve prevailing upstream of the particle filter is determined using a temperature model which is stored for example in a memory. For this, a calculation unit could determine the first exhaust gas temperature curve on the basis of parameters of the internal combustion engine, such as for example a rotation speed etc., and/or ambient data such as for example an ambient temperature. In this way, the second temperature sensor could be omitted, whereby the method may advantageously be operated simply. Also, measurement inaccuracies and measurement errors could be avoided.

According to an embodiment, integration of the first heat flow curve and the second heat flow curve first begins as soon as the first exhaust gas temperature curve has reached a specific threshold value. It is conceivable that one of the method steps is first initiated as soon as the first exhaust gas temperature curve has reached the specific threshold value. According to one embodiment, the first threshold value is 100° C. In particular in the warm-up phase of the exhaust gas tract, it may be suitable for certain method steps only to be initiated when the first exhaust gas temperature curve has exceeded a specific threshold value. In this way, any false results relating to the presence of the particle filter may be avoided, wherein these results might have been determined if all method steps were initiated directly following the start-up of the internal combustion engine. Accordingly, a possibly false result would correctly not be determined. This makes determining the presence of the particle filter particularly reliable.

According to an embodiment, integration of the first heat flow curve and the second heat flow curve ends as soon as the first heat quantity or the first exhaust gas temperature curve has reached a further predefined threshold value. According to one embodiment, the further predefined threshold value of the first exhaust gas temperature curve lies at 200° C., in particular 250° C.

According to another embodiment, integration of the first heat flow curve and the second heat flow curve ends after a predefined time period which begins as soon as integration of the first heat flow curve and second heat flow curve begins. The predefined time period may for example be stored in the memory. Thus in a particularly simple fashion, it is possible always to integrate over precisely the same time period, so that comparison of the first heat quantity and the second heat quantity is particularly simple.

According to another embodiment, for determining the first heat quantity, a change in the first specific heat capacity based on a change in the first exhaust gas temperature curve and/or a change in a stoichiometric air ratio is taken into account.

According to a further embodiment, for determining the second heat quantity, a change in the second specific heat capacity based on a change in the second exhaust gas temperature and/or a change in the air ratio is taken into account.

The first specific heat capacity and the second specific heat capacity of the exhaust gas are generally dependent on status variables, in particular temperature. If the exhaust gas temperature changes, accordingly the specific heat capacity changes. The first exhaust gas temperature curve and the second exhaust gas temperature curve change over time. Accordingly, for determining the first heat quantity and the second heat quantity, it may be suitable to take into account the change in exhaust gas temperature curves for determining the corresponding specific heat capacities. In this way, it is determined, particularly advantageously in a reliable and robust fashion, whether the particle filter is correctly present at the installation position.

The air ratio gives the ratio of the air quantity supplied for combustion of a quantity unit of the supplied fuel to the minimum air quantity necessary for complete combustion. The first specific heat capacity and the second specific heat capacity of the exhaust gas are also dependent on the air ratio. The prevailing air ratio is determined. Accordingly, for determining the first heat quantity and the second heat quantity, it may be suitable to take into account the change in air ratio for determining the corresponding specific heat capacities. In this way, errors are avoided and it is determined, advantageously in a reliable and robust fashion, whether the particle filter is correctly present at the installation position.

According to an embodiment, for evaluation, a ratio of the first heat quantity and the second heat quantity is determined. The ratio of the first heat quantity and the second heat quantity gives a value which advantageously is very easy to evaluate. This value may for example be compared with a comparison value stored in a memory. Then from this comparison, it may very easily be determined whether the particle filter is correctly present at the installation position. According to one embodiment, the dividend of the ratio is the first heat quantity, and the divisor of the ratio is the second heat quantity.

According to a refinement, the dividend of the ratio is the difference between the first heat quantity and the second heat quantity, and the divisor of the ratio is the first heat quantity. From this ratio, it may advantageously be determined whether the particle filter is correctly installed in the installation position.

The formula for calculating this ratio is accordingly:

$$i = \frac{Q\_up - Q\_dw}{Q\_up}$$

wherein i is the ratio, Q_up is the first heat quantity and Q_dw is the second heat quantity.

According to an embodiment, the ratio is comparatively large if a particle filter is installed in the installation position, insofar as the dividend of the ratio is the difference between the first heat quantity and the second heat quantity, and the divisor of the ratio is the first heat quantity. According to a further embodiment, the ratio is comparatively small if no correct particle filter is installed in the installation position, insofar as the dividend of the ratio is the difference between the first heat quantity and the second heat quantity, and the divisor of the ratio is the first heat quantity. According to one embodiment, the ratio is comparatively small if it assumes a value within the value range from 0.1 to 0.3. According to one embodiment, the ratio is comparatively large mall if it assumes a value within the value range from 0.6 to 0.8.

According to one embodiment, an entry is made in a fault memory if the evaluation of the first heat quantity and of the second heat quantity indicates that the particle filter is not correctly installed in the installation position. Because of the entry in the fault memory, it is comparatively easy to check whether the particle filter is correctly installed. In this way, concealment of an absence of a particle filter is avoided.

According to a further embodiment, a fault display device gives a signal if the evaluation of the first heat quantity and of the second heat quantity indicates that the particle filter is not correctly installed in the installation position. The fault display device for example indicates faults or problems to a driver. Therefore it may be suitable for the driver to be informed by means of the fault display that the particle filter is not correctly installed in the installation position, or no correct particle filter is installed. According to a further embodiment, if the method according to the invention determines that the particle filter is not correctly installed, a data transmission may take place to an authority or to the manufacturer of the internal combustion engine, wherein the transmitted data indicate to the authority or manufacturer that the particle filter is not correctly installed in this exhaust gas tract.

Furthermore, a device is disclosed for determining a presence of a particle filter in the exhaust gas tract of a petrol-operated internal combustion engine, wherein the device has a control unit which is configured to control a method according to the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

An exemplary embodiment of the present disclosure is illustrated in the figures and will be explained in more detail with reference to the following description. The drawings show.

DETAILED DESCRIPTION OF THE PREFERRED EMBODIMENTS

The following description of the preferred embodiment(s) is merely exemplary in nature and is in no way intended to limit the invention, its application, or uses.

Figure 1:
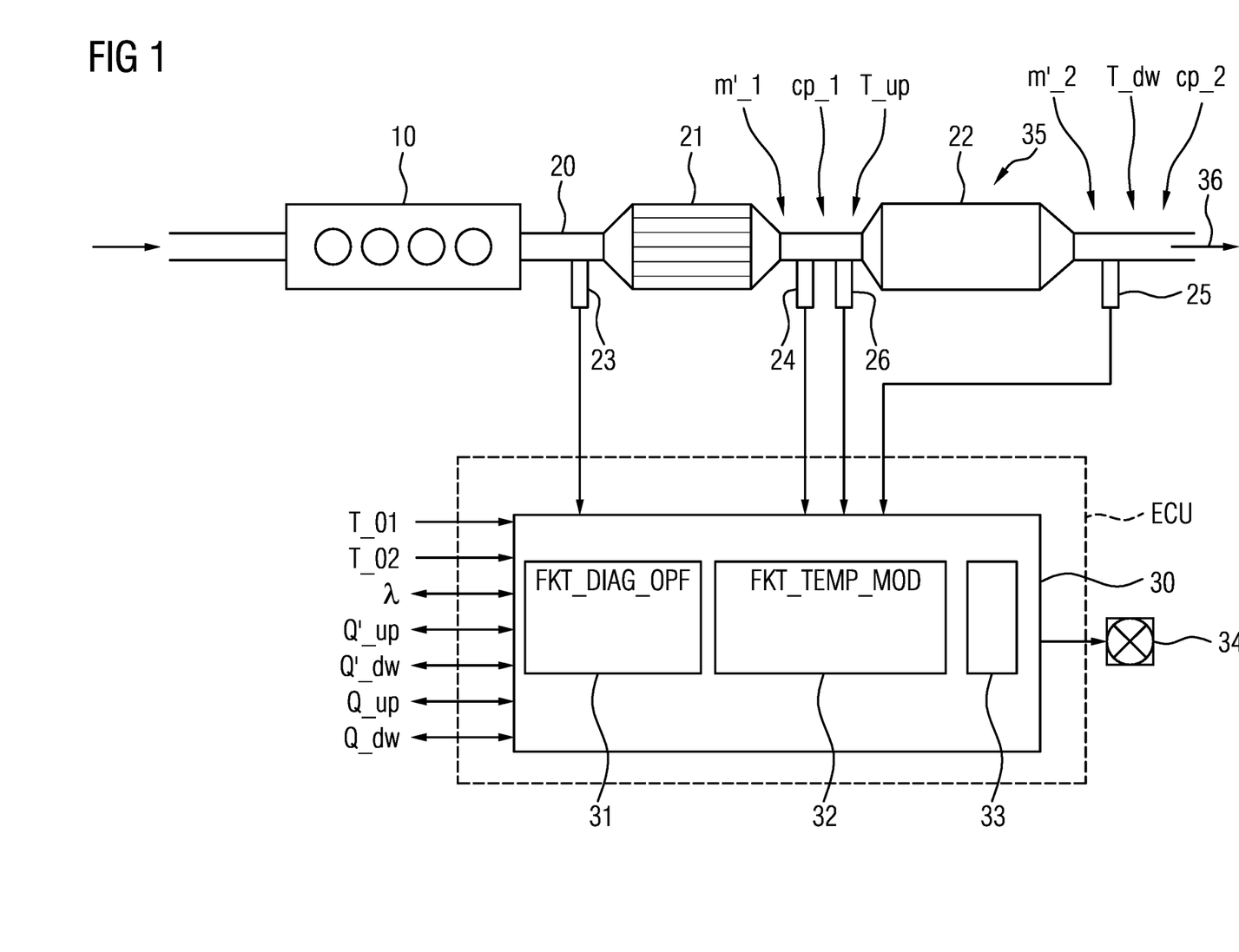
FIG. 1 diagrammatically, an internal combustion engine with associated exhaust gas aftertreatment system according to a first embodiment.

FIG. 1 shows a block diagram of an internal combustion engine 10 with an exhaust gas tract 20. The exhaust gas tract 20 serves to discharge an exhaust gas 36 from at least one combustion chamber of the internal combustion engine 10 and after-treat the exhaust gas 36. Accordingly, the exhaust gas 36 flows through the exhaust gas tract 20. The exhaust gas tract 20 has an exhaust gas catalytic converter 21 and a particle filter 22 arranged downstream of the exhaust gas catalytic converter 21. Accordingly, the exhaust gas tract 20 includes a first exhaust gas sensor 23 and a second exhaust gas sensor 24. The first exhaust gas sensor 23 is arranged upstream of the exhaust gas catalytic converter 21, and the second exhaust gas sensor 24 is arranged downstream of the exhaust gas catalytic converter 21.

Also, the exhaust gas tract 20 includes a first exhaust gas temperature sensor 25 and a second exhaust gas temperature sensor 26. The first exhaust gas temperature sensor 25 is arranged downstream of an installation position 35 of the particle filter 22, and the second exhaust gas temperature sensor 26 is arranged upstream of the installation position 35 of the particle filter 22.

The first exhaust gas temperature sensor 25 is configured to measure the temperature of the exhaust gas 36 downstream of the particle filter 22. The first exhaust gas temperature sensor 25 is accordingly configured to measure over a specific time a second exhaust gas temperature curve T_dw of the temperature of the exhaust gas downstream of the particle filter 22.

The second exhaust gas temperature sensor 26 is configured to measure the temperature of the exhaust gas 36 upstream of the particle filter 22. The second exhaust gas temperature sensor 26 is accordingly configured to measure over a specific time a first exhaust gas temperature curve T_up which prevails upstream of the particle filter 22.

FIG. 1 also shows an engine control unit ECU which has a control unit 30. The control unit 30 has a block 31 for checking the presence of the particle filter 22, a block 32 containing a temperature model, and a fault memory 33. FIG. 1 also shows a fault display device 34 which is actuated by the control unit 30.

Measurement results from the first exhaust gas sensor 23 and second exhaust gas sensor 24 are transmitted to the control unit 30. In addition, the first exhaust gas temperature curve T_up and the second exhaust gas temperature curve T_dw are transmitted to the control unit 30.

A first standard temperature curve T_01 and a second standard temperature curve T_02 are also stored in the control unit 30. In addition, the control unit 30 is configured to determine, from an air ratio λ and the first exhaust gas temperature curve T_up, a first specific heat capacity cp_1 of the exhaust gas 36 upstream of the installation position 35 of the particle filter 22. Also, the control unit 30 is configured to determine, from the air ratio λ and the second exhaust gas temperature curve T_dw, a second specific heat capacity cp_2 of the exhaust gas 36 downstream of the installation position 35 of the particle filter 22.

The control unit 30 is also configured to determine a first mass flow $m'\_1$ of the exhaust gas 36 upstream of the installation position 35 of the particle filter 22 of the basis of data from the internal combustion engine 10. The control unit 30 is also configured to determine a second mass flow $m'\_2$ of the exhaust gas 36 downstream of the installation position 35 of the particle filter 22. According to an embodiment, the first mass flow $m'\_1$ corresponds to the second mass flow $m'\_2$.

The control unit 30 is configured to determine a first heat flow curve $Q'\_up$ from the first mass flow $m'\_1$, the first specific heat capacity $cp\_1$, the first exhaust gas temperature curve $T\_up$ and the first standard temperature curve $T\_01$. Furthermore, the control unit 30 is configured to determine a second heat flow curve $Q'\_dw$ from the second mass flow $m'\_2$, the second specific heat capacity $cp\_2$, the second exhaust gas temperature curve $T\_dw$ and the second standard temperature curve $T\_02$.

The control unit 30 is furthermore configured to determine a first heat quantity $Q\_up$ transmitted during a specific time upstream of the installation position 35 of the particle filter 22. In addition, the control unit 30 is configured to determine a second heat quantity $Q\_dw$ transmitted during a specific time downstream of the installation position 35 of the particle filter 22. The control unit 30 is configured to first begin determination of the first heat quantity $Q\_up$ and the second heat quantity $Q\_dw$ as soon as the first exhaust gas temperature curve $T\_up$ has exceeded a first threshold value 40. Furthermore, the control unit 30 is configured to end the determination of the first heat quantity $Q\_up$ and the second heat quantity $Q\_dw$ as soon as the first exhaust gas temperature curve $T\_up$ has exceeded a second threshold value 41. According to another embodiment, the control unit 30 may also be configured to end the determination of the first quantity $Q\_up$ and the second heat quantity $Q\_dw$ as soon as a predefined time period has elapsed, wherein the time period begins as soon as the first exhaust gas temperature curve $T\_up$ has exceeded the first threshold value 40.

According to another embodiment, the control unit 30 may also be configured to determine the first exhaust gas temperature curve $T\_up$ by means of a function for modelling the temperature $FKT\_TEMP\_MOD$.

Figure 2:
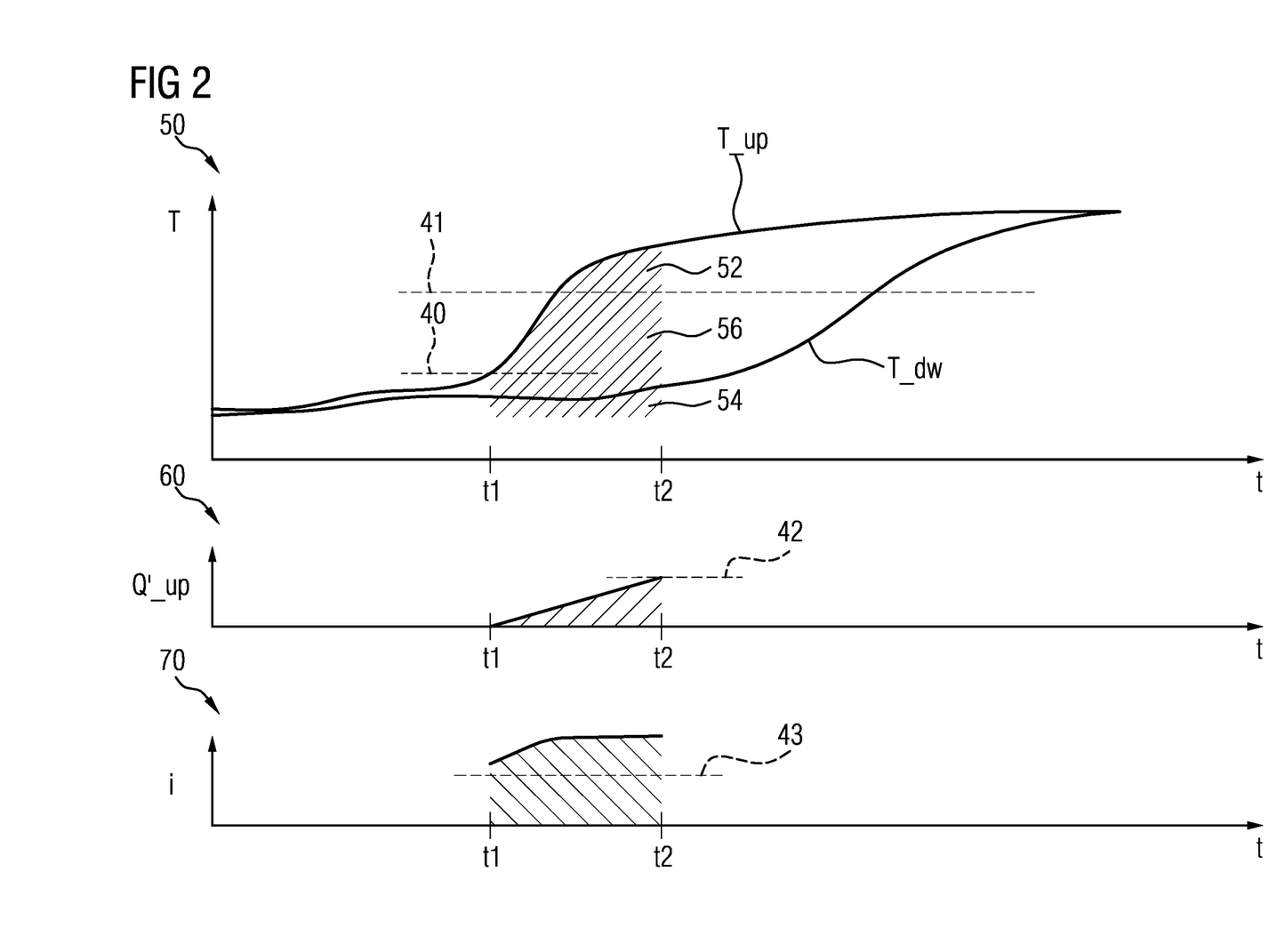
FIG. 2 diagrams of the temporal development of various parameters of an exhaust gas aftertreatment system according to a second embodiment, when a monolith is correctly installed in the particle filter.
Figure 3:
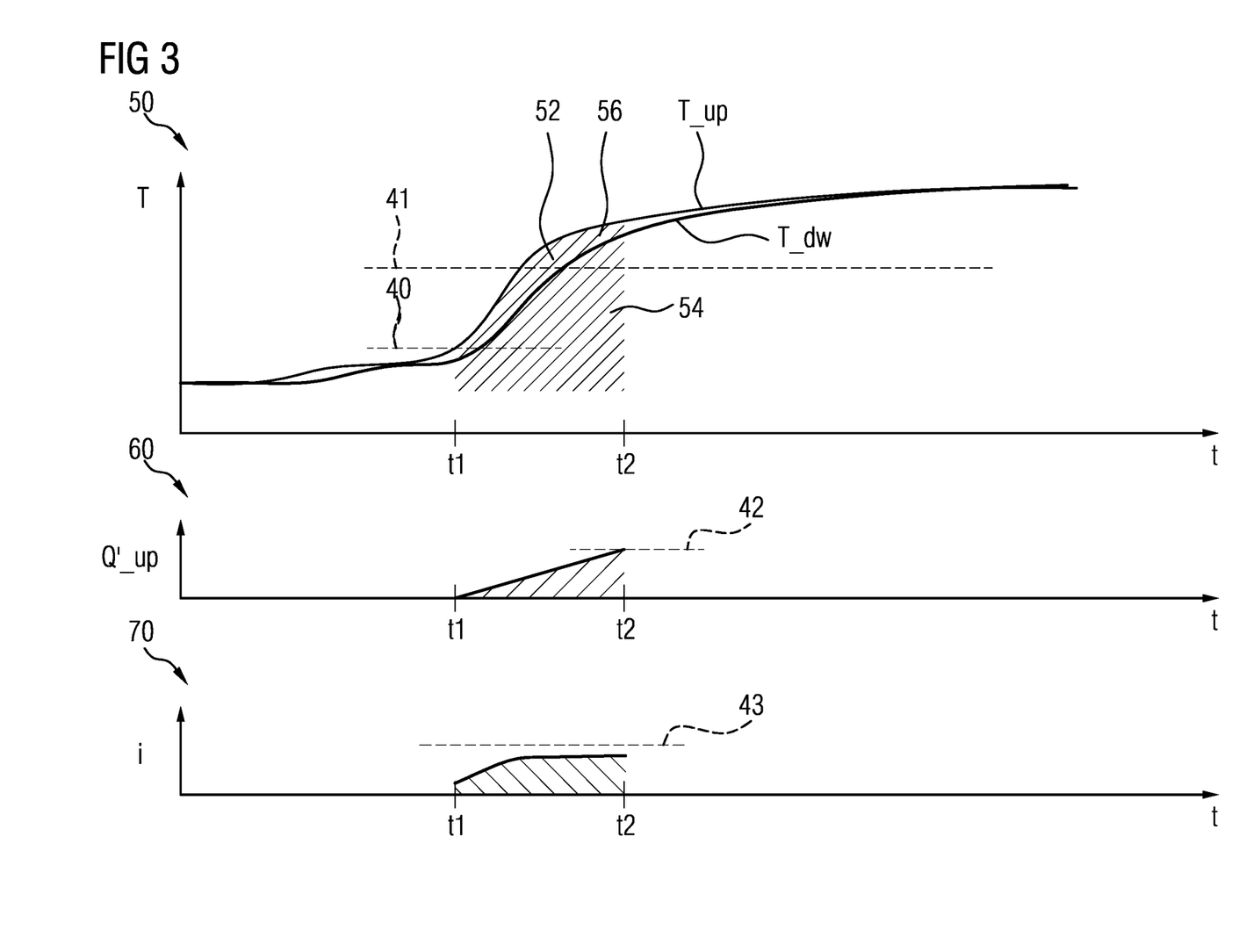
FIG. 3 diagrams of the temporal development of various parameters of an exhaust gas aftertreatment system according to a third embodiment, when there is no monolith in the particle filter.

The control unit 30 is also configured to form a ratio i from the first heat quantity $Q\_up$ and the second heat quantity $Q\_dw$, and compare this ratio i with a comparison value 43 (see FIGS. 2, 3). The control unit 30 is configured to conclude from this comparison whether the particle filter 22 is installed in the installation position 35, or to conclude whether a monolith is present in the particle filter 22.

FIGS. 2 and 3 each show a first diagram 50 in which the temperature prevailing in the exhaust gas 36 upstream of the installation position 35 of the particle filter 22, and the temperature T prevailing in the exhaust gas 36 downstream of the installation position 35 of the particle filter 22, are shown over the time t. Accordingly, the first exhaust gas temperature curve $T\_up$ and the second exhaust gas temperature curve $T\_dw$ are shown. In addition, the first diagrams 50 each show the first threshold value 40 and the second threshold value 41. It is clear that integration of the first heat flow curve $Q'\_up$ first begins as soon as the first exhaust gas temperature curve $T\_up$ has exceeded the first threshold value 40.

The first diagram 50 in FIG. 2, and the first diagram 50 in FIG. 3, differ in particular in the second exhaust gas temperature curve $T\_dw$. In the first diagram 50 of FIG. 2, the second exhaust gas temperature curve $T\_dw$ follows the rise of the first exhaust gas temperature curve $T\_up$ comparatively slowly. In the first diagram 50 of FIG. 3, the second exhaust gas temperature curve $T\_dw$ follows the rise of the first exhaust gas temperature curve $T\_up$ comparatively quickly.

The first diagram 50 of FIGS. 2 and 3 furthermore shows a first area 52 which extends below the first exhaust gas temperature curve $T\_up$ between a first time t1 and a temporally successive second time t2. In addition, a second area 54 is shown which extends below the second exhaust gas temperature curve $T\_dw$ between the first time t1 and the second time t2. Also, a difference area 56 is shown which is determined from the difference between the first area 52 and the second area 54. It is clear that the difference area 56 of the first diagram 50 in FIG. 2 is much larger than the difference area 56 of the first diagram 50 in FIG. 3.

In addition, FIGS. 2 and 3 each show a second diagram 60, which in each case represents the first heat quantity $Q\_up$ determined during the time t. For this, the first heat flow curve $Q'\_up$ is shown over the time t. It is clear from the diagrams that determination of the transmitted first heat quantity begins as soon as time t1 has been passed, and ends as soon as the third threshold value 42 is reached at time t2. The area below the curve shown in the second diagrams 60, which represents the first heat flow curve $Q'\_up$, represents the first heat quantity $Q\_up$ transmitted in the period from time t1 to time t2.

FIGS. 2 and 3 each also show a third diagram 70, which in each case shows a ratio i of the first heat quantity $Q\_up$ and the second heat quantity $Q\_dw$ over the time, in particular from time t1 to time t2. Also, a comparison value 43 is shown. The third diagram 70 of FIG. 2 differs from third diagram 70 of FIG. 3 in that the ratio i n the third diagram 70 of FIG. 2 permanently lies above the comparison value 43, whereas the ratio i in the third diagram 70 of FIG. 3 permanently lies below the comparison value 43. In the present case, accordingly it may be concluded from the first diagram 70 of FIG. 2 that the particle filter 22 is correctly installed, and it may be concluded from the third diagram 70 of FIG. 3 that the particle filter 22 is not correctly installed.

The description of the invention is merely exemplary in nature and, thus, variations that do not depart from the gist of the invention are intended to be within the scope of the invention. Such variations are not to be regarded as a departure from the spirit and scope of the invention.

LIST OF DESIGNATIONS

10 Internal combustion engine
20 Exhaust gas tract
21 Exhaust gas catalytic converter
22 Particle filter
23 First exhaust gas sensor
24 Second exhaust gas sensor
25 First exhaust gas temperature sensor
26 Second exhaust gas temperature sensor
30 Control unit
31 Block function for checking particle filter
32 Block temperature model
33 Fault memory
34 Fault display device
35 Installation position
36 Exhaust gas
40 First threshold value
41 Second threshold value
42 Third threshold value
43 Comparison value
50 First diagram 52 First area
54 Second area
56 Difference area
60 Second diagram
70 Third diagram
T Temperature
t Time
t1 First time
t2 Second time
T_up First exhaust gas temperature curve
T_dw Second exhaust gas temperature curve
T_01 First standard temperature curve
T_02 Second standard temperature curve
ECU Engine control unit
FKT_DIAG_OPF Function for checking particle filter
FKT_TEMP_MOD Function for modelling temperature
m'_1 First mass flow
m'_2 Second mass flow
cp_1 First specific heat capacity
cp_2 Second specific heat capacity
λ Air ratio
Q'_up First heat flow curve
Q'_dw Second heat flow curve
Q_up First heat quantity
Q_dw Second heat quantity
i Ratio

What is claimed is:

1. A method for determining a presence of a correct particle filter in an exhaust gas tract of a petrol-operated internal combustion engine, the method comprising:
    determining a first exhaust gas temperature curve which occurs in the exhaust gas tract upstream of an installation position of a particle filter;
    measuring a second exhaust gas temperature curve by a first temperature sensor arranged downstream of the installation position of the particle filter;
    determining a first heat quantity by integration over a specific time of a first heat flow curve which is determined by a first exhaust gas mass flow, a first specific heat capacity and the first exhaust gas temperature curve, the determining of the first heat quantity comprises taking into account a change in the first specific heat capacity based on a change in air ratio, the air ratio being a ratio of air quantity supplied for combustion of a quantity unit of supplied fuel to a minimum air quantity necessary for complete combustion;
    determining a second heat quantity by integration over the specific time of a second heat flow curve which is determined by a second exhaust gas mass flow, a second specific heat capacity and the second exhaust gas temperature curve; and
    evaluating the first heat quantity and the second heat quantity in order to determine the presence of the correct particle filter.

2. The method of claim wherein 1, the first exhaust gas temperature curve is determined by a second temperature sensor which is arranged upstream of the installation position of the particle filter.

3. The method of claim 1, wherein the first exhaust gas temperature curve is determined by a predefined temperature model.

4. The method of claim 1, wherein integrating the first heat flow curve and the second heat flow curve occurs as soon as the first exhaust gas temperature curve has reached a specific first threshold value.

5. The method of claim 1, wherein the determining of the second heat quantity further comprises taking into account a change in the second specific heat capacity based on a change in the second exhaust gas temperature curve.

6. The method of claim 1, further comprising determining a ratio of the first heat quantity and the second heat quantity for ratio evaluation.

7. The method of claim 6, further comprising:
    providing a dividend of the ratio to be the difference between the first heat quantity and the second heat quantity; and
    providing a divisor of the ratio to be the first heat quantity.

8. The method of claim 7, further comprising:
    providing the ratio to be comparatively large if the particle filter is correctly installed in the installation position; and
    providing the ratio to be comparatively small if the particle filter is incorrectly installed in the installation position.

9. The method of claim 6, further comprising:
    providing a comparison value stored in a memory of an engine control unit (ECU) of the internal combustion engine; and
    using the comparison value in the ratio evaluation.

10. The method of claim 1, further comprising:
    providing a fault memory; and
    providing an entry into the fault memory if the evaluation of the first heat quantity and of the second heat quantity indicates that the particle filter is not correctly installed in the installation position.

11. The method of claim 1 further comprising:
    providing a fault display;
    providing a signal emitted to a driver from the fault display if the evaluation of the first heat quantity and of the second heat quantity indicates that the particle filter is not correctly installed in the installation position.

12. The method of claim 1, further comprising:
    providing a device for determining a presence of the particle filter in the exhaust gas tract of a petrol-operated internal combustion engine.

13. A device for determining a presence of a correct particle filter in an exhaust gas tract of a petrol-operated internal combustion engine, the device comprising a control unit configured for:
    determining a first exhaust gas temperature curve which occurs in the exhaust gas tract upstream of an installation position of the particle filter;
    measuring a second exhaust gas temperature curve by a first temperature sensor arranged downstream of the installation position of the particle filter;
    determining a first heat quantity by integration over a specific time of a first heat flow curve which is determined by a first exhaust gas mass flow, a first specific heat capacity and the first exhaust gas temperature curve, the determining of the first heat quantity comprises taking into account a change in the first specific heat capacity based a change in air ratio, the air ratio being a ratio of air quantity supplied for combustion of a quantity unit of supplied fuel to a minimum air quantity necessary for complete combustion;
    determining a second heat quantity by integration over the specific time of a second heat flow curve which is determined by a second exhaust gas mass flow, a second specific heat capacity and the second exhaust gas temperature curve; and
    evaluating the first heat quantity and the second heat quantity in order to determine the presence of the correct particle filter.

14. The device of claim 13, wherein the first exhaust gas temperature curve is determined by a second temperature sensor which is arranged upstream of the installation position of the particle filter.

15. The device of claim 13, wherein the first exhaust gas temperature curve is determined by a predefined temperature model.

16. The device of claim 13, wherein the control unit is further configured for integrating the first heat flow curve and of the second heat flow curve as soon as the first exhaust gas temperature curve has reached a specific first threshold value.

17. The device of claim 13, wherein the control unit is further configured for taking into account a change in the second specific heat capacity based on at least one of a change in the second exhaust gas temperature curve when determining the second heat quantity.

18. The device of claim 13, wherein if the evaluation of the first heat quantity and of the second heat quantity indicates that the particle filter is not correctly installed in the installation position the control unit is further configured to perform at least one of providing an entry into a fault memory or providing a signal emitted from a fault display.

* * * * *